March 17, 1959
E. H. GEWALT ET AL
2,877,616
CROP HARVESTER
Filed Nov. 1, 1954
4 Sheets-Sheet 1
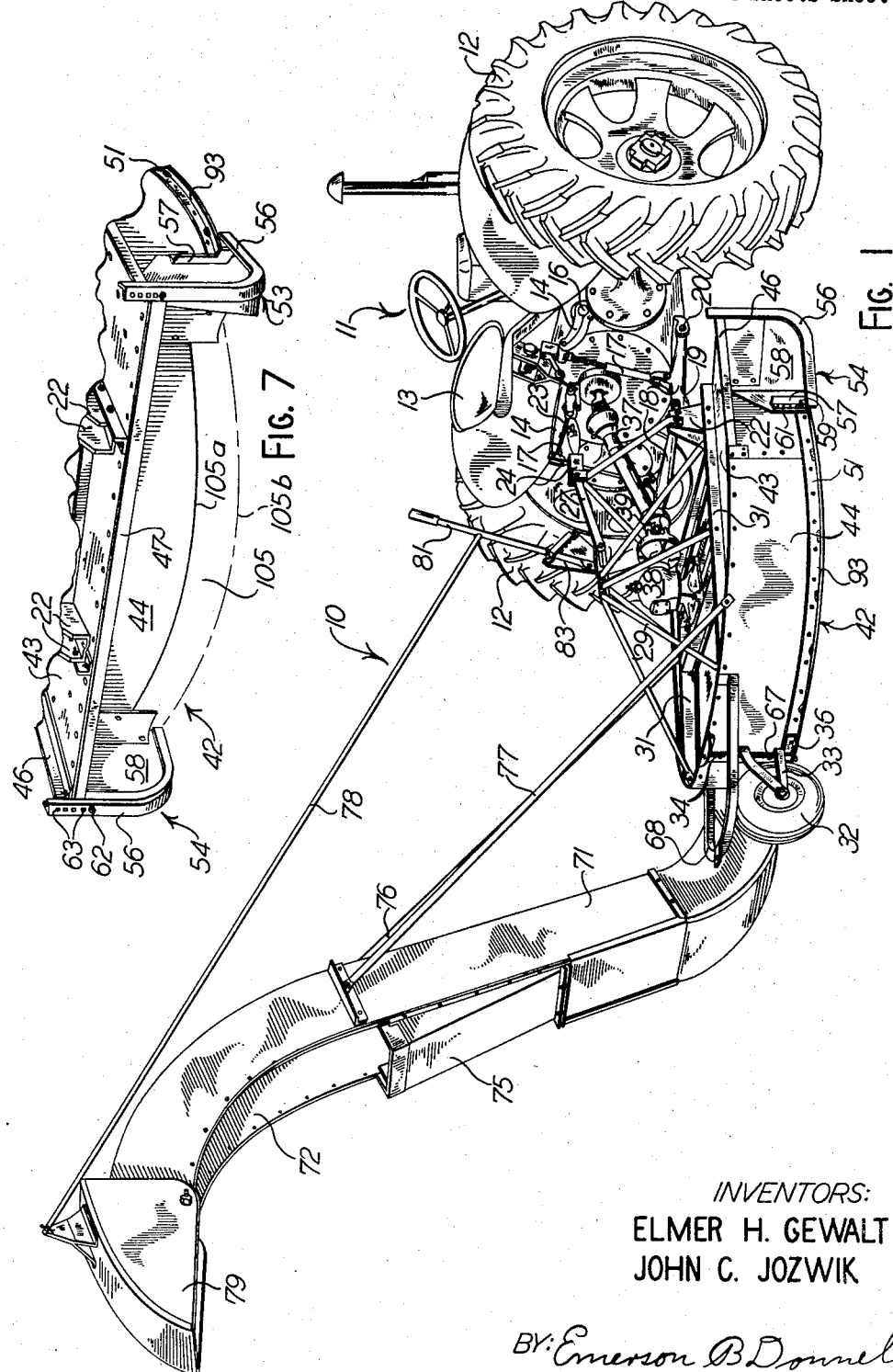
INVENTORS:
ELMER H. GEWALT
JOHN C. JOZWIK
BY: Emerson B Donnell
ATTORNEY

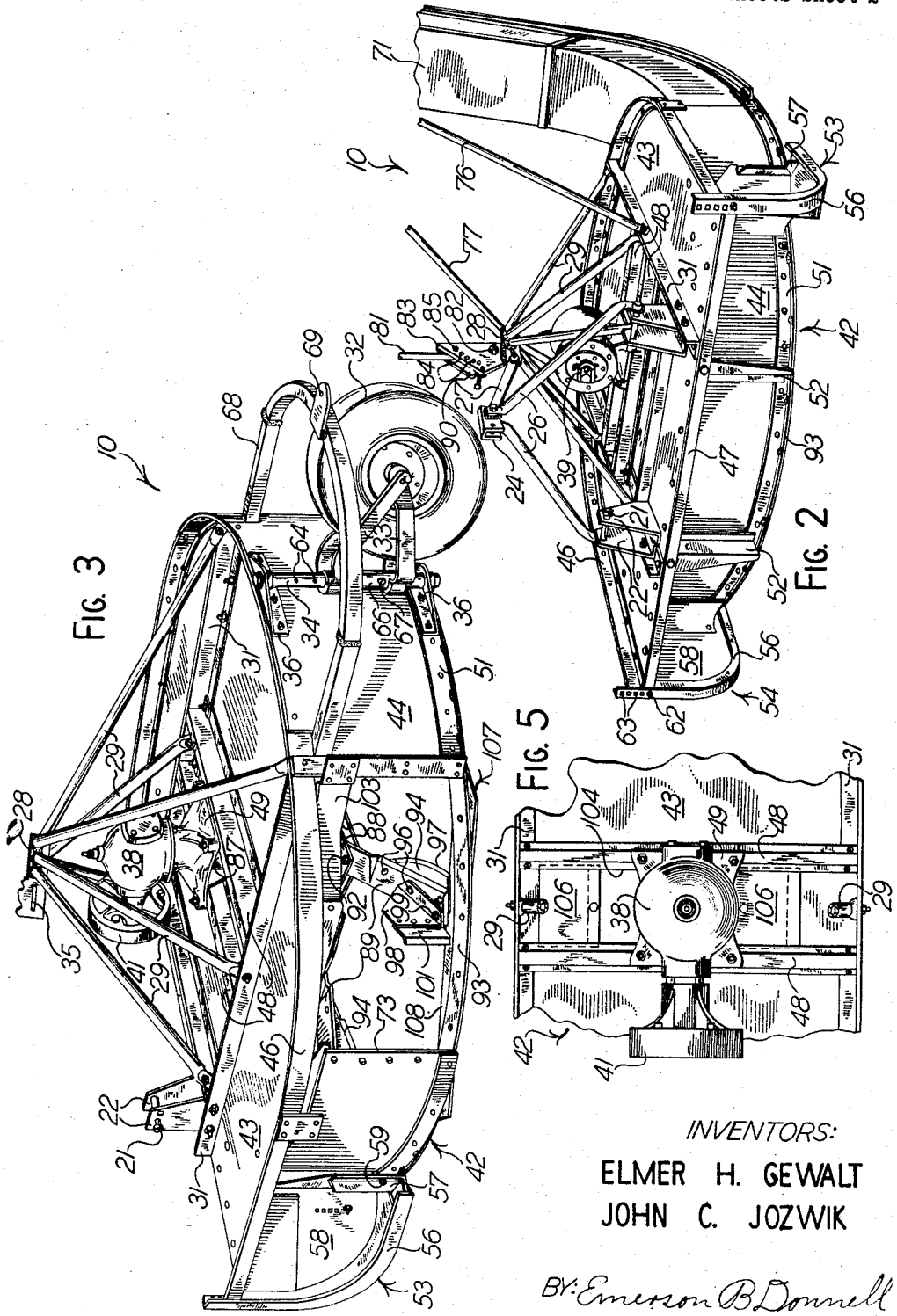

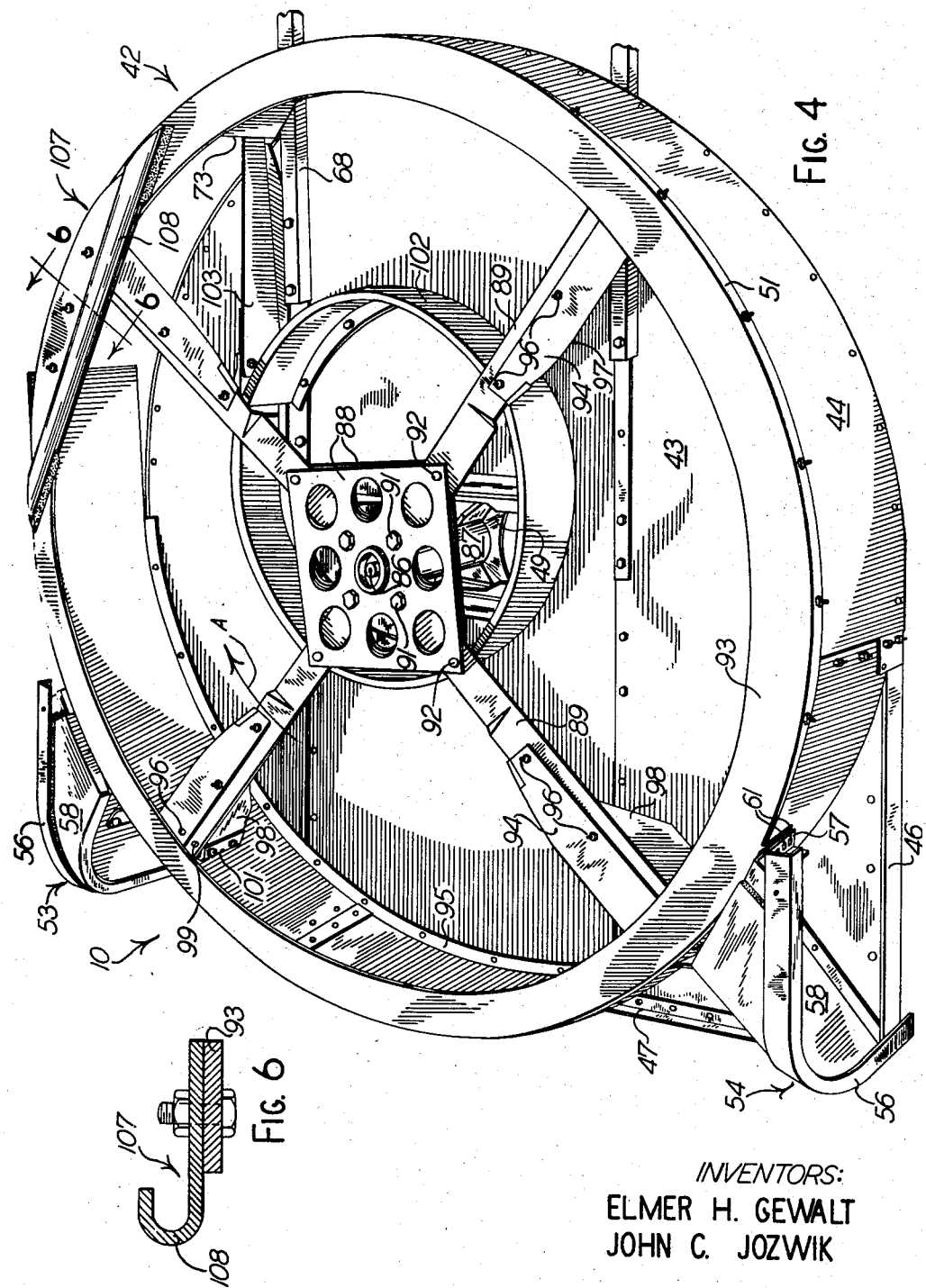

March 17, 1959
E. H. GEWALT ET AL
2,877,616
CROP HARVESTER
Filed Nov. 1, 1954
4 Sheets-Sheet 4
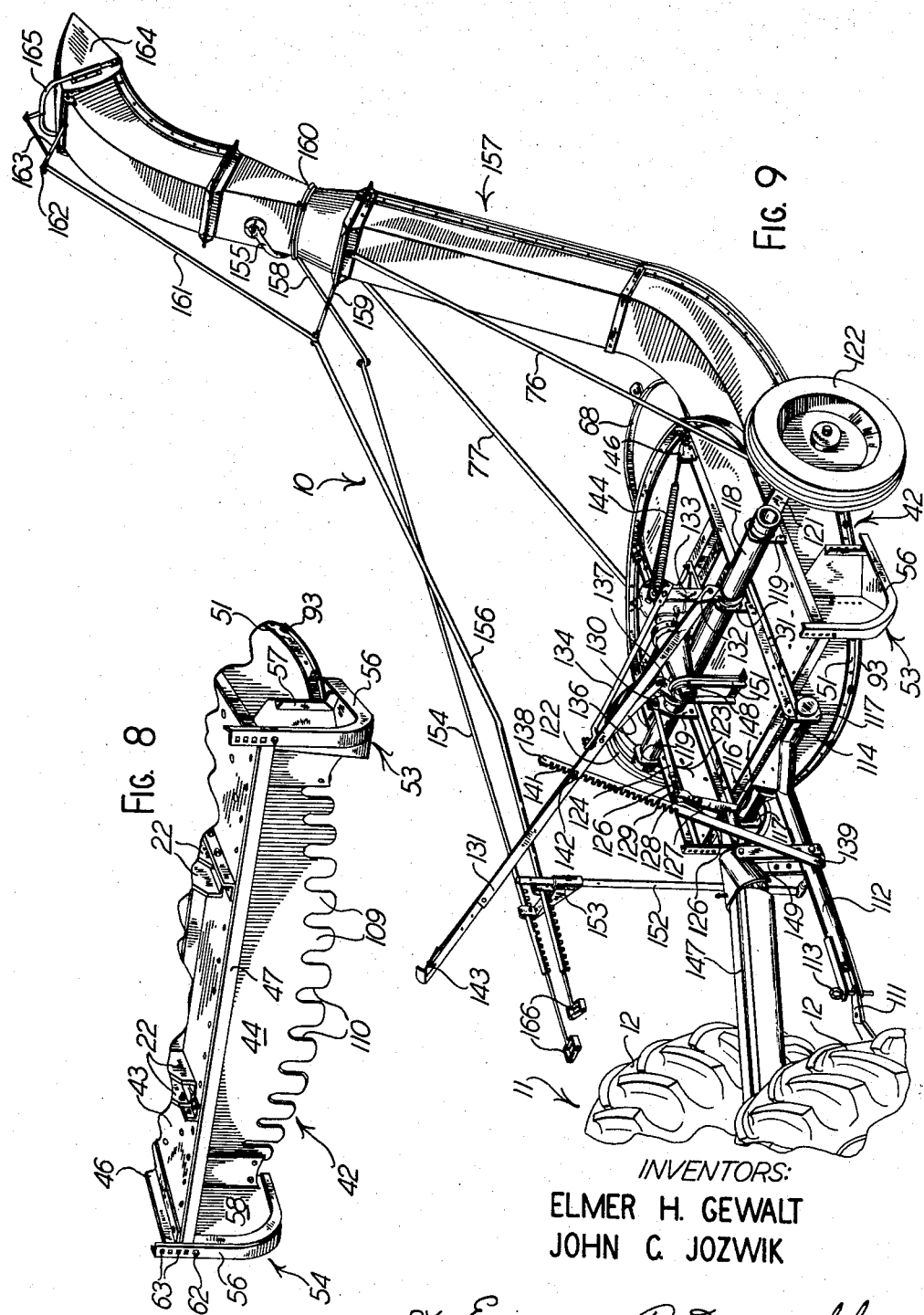
INVENTORS:
ELMER H. GEWALT
JOHN C. JOZWIK
BY: Emerson B Donnell
ATTORNEY

United States Patent Office 2,877,616
Patented Mar. 17, 1959

2,877,616

CROP HARVESTER

Elmer H. Gewalt and John C. Jozwik, Racine, Wis., assignors to J. I. Case Company, Racine, Wis.

Application November 1, 1954, Serial No. 466,056

10 Claims. (Cl. 56—23)

This invention relates to agricultural crop harvesters, and, specifically it relates to crop harvesters of the type having a vertically disposed cutter wheel shaft.

It is an object of this invention to provide a crop harvester which performs the functions of cutting standing crops, chopping them, and elevating the chopped material through a delivery stack and into a wagon, all with one unit.

Another object of this invention is to provide a crop harvester which will, with a single unit, perform the functions of picking up loose crops from the ground and chopping the crops and delivering them through a stack into a wagon.

Another object is to provide a crop harvester pickup and delivery unit of the blower type wherein the air intake can be regulated.

Still another object is to provide a crop harvester which can be adjusted to process crops of varying sizes.

An additional object is to provide a crop harvester which is adjustable to leave crop stubble at a selected height.

Still another object is to provide a crop harvester which can be adjusted to selected vertical positions and tilted or leveled in a position.

Another object is to provide a crop harvester which is inexpensive in manufacture and safe to use and is simultaneously sturdy and efficient.

Another object is to provide a crop harvester which readily permits delivery of cut crops at any selected position with respect to the line of travel of said harvester.

Another object is to provide a crop harvester which automatically clears crops out of the crop delivery stack entrance.

Another object is to provide a crop harvester pickup and delivery unit of the blower type which will pick up debris, such as leaves, from the ground and deliver said debris into a wagon.

A further object is to provide a crop harvester which cuts standing crops, chops the cut crops, and delivers the chopped material into a wagon or onto the ground with said harvester capable of being easily and readily attached to a propelling tractor.

Other objects and advantages will become apparent upon reading the following description in conjunction with the accompanying drawings, wherein, Fig. 1 is a rear perspective view of a preferred embodiment of a harvester of this invention attached to the rear of a tractor.

Fig. 2 is a front perspective view of a fragment of the harvester shown in Fig. 1, but without the tractor.

Fig. 3 is an enlarged rear perspective view of the harvester shown in Fig. 1, with parts removed.

Fig. 4 is an enlarged bottom perspective view of a fragment of the harvester shown in Fig. 2.

Fig. 5 is a top plan view of a fragment of the harvester.

Fig. 6 is an enlarged sectional view taken on the line 6—6 of Fig. 4.

Fig. 7 is a fragmentary front perspective view of an alternate structure with parts broken away.

Fig. 8 is a fragmentary front perspective view of another alternate structure with parts broken away.

Fig. 9 is a front perspective view of the harvester shown in Fig. 1, but with parts broken away and parts shown in section and with a different tractor hitch structure.

Similar reference numerals refer to similar parts throughout the drawings.

In Fig. 1 there is shown a harvester 10 attached to a tractor 11 for supporting and mobilizing the harvester through crops to be processed. The tractor is of a well-known type and includes a pair of rear wheels 12 with a driver's seat 13 mounted on the tractor chassis between the wheels. The usual hydraulically operated arms 14 are pivotally attached at 16 to the rear end of the tractor to pivotally attach to depending connecting links 17. The latter connect to a pair of hitch arms 18 which are also pivotally attached at 20 to the tractor to extend rearwardly therefrom in the usual manner. The arms 18 terminate in hitch clamps 19 which engage horizontal hitch pins 21 secured on vertical plates 22 bolted to the top of the harvester 10, as also shown in Fig. 2.

Also disclosed in Fig. 1 is a mast connection or bracing means between the tractor and the harvester. Thus, the usual tractor pivotal turnbuckle 23 extends rearwardly of the tractor to attach to a bracket 24 which is supported on the harvester by a pair of inclined braces 26 bolted at their lower ends to the plates 22. Also, a rearward brace 27 is attached to the bracket 24 to extend along the longitudinal plane of the harvester to a plate 28, as shown in Figs. 1 and 2. A plurality of braces 29 are suitably attached to the plane 28 to depend to a pair of angle irons 31 which are bolted to the top of the harvester to be longitudinally and horizontally disposed in the level position of the harvester.

With the foregoing described construction, the harvester is towed by the tractor and the latter can raise the harvester to carry it off the ground or to only tilt it. In tilting the harvester, the hitch arms are powered upwardly, for instance, by the hydraulic system to raise the tractor end of the harvester. At this time it should be noted that a ground wheel 32 is rotatably attached to the rear end of the harvester through brackets 33 which are suitably pivotally attached to the harvester 10 by a vertical post 34 mounted in upper and lower plates 36. See also Fig. 3. Thus, the rear of the harvester is supported on the ground by the semi-castoring wheel 32. When the front end of the harvester is raised, the rear end initially remains on the ground and the harvester is then tilted for an operating position mentioned later. Continued raising of the front end will cause the turnbuckle 23 to restrain the bracket 24 of the mast from moving backward and the entire harvester is then lifted off the ground in a transport position. Since the turnbuckle is of a conventional type, it is adjustable in length and, therefore, permits various positions of tilt of the harvester 10 for operating purposes.

At this time, it should be noted in Figs. 1 and 3 that the plate 28 is provided with a longitudinal slot 35 which receives the rear end of the brace 27. Then, since the harvester is pivotal at the hitch, when the wheel 32 encounters a rise on the ground, the harvester can accommodate the rise by pivoting up at the rear as the brace 27 slides in the slot 35.

Another connection between the tractor 11 and the harvester 10 is the power take-off shaft 37 which is drivingly engaged, in any suitable manner, with the usual power take-off of the tractor. The shaft 37 is also engaged to a gear box 38, mounted on the top of the harvester, with the drive engagement being effected through a universal joint 39 and a clutch 41. See also Figs. 2 and 3. It is preferred that the shaft 37 be telescopic, as shown, to change its overall length and thereby permit the tilting and raising described above. Since this type of shaft is conventional, it need not be further described. It does, of course, transmit rotary power from the tractor to the harvester gear box 38. Also, it is preferred that the clutch 41 be of an over-running and torque limiting type to transmit a limited driving power from the tractor to the harvester only and not the reverse.

Also shown in Fig. 1 is a harvester cylindrical housing 42 which has a vertical axis. The housing 42 is formed of a top 43 and a cylindrical side 44 with the latter two, as shown in Figs. 1 and 2, bolted together through a semi-circular angle iron 46. The forward ends of the iron 46, and the forward end of the top 43, extend beyond the limits of the side 44 to where a straight angle iron 47 attaches to the top between the ends of the iron 46. The angle irons 31 extend across the top 43 and are attached between the irons 46 and 47. A pair of channel members 48 are attached to the top between the irons 31 with one in front and one behind the gear box 38. The top is discontinuous through the area between the members 48 to permit the rotary power which is introduced into the gear box to be transmitted into the housing 42 in a manner hereinafter apparent. The gear box 38 has a base 49 which is preferably bolted to the top of the channel members 48 to provide a sturdy support for the gear box.

Referring to the base of the housing cylinder 44, it will be seen that a circular rim 51 is bolted to the cylinder. Also, braces 52, shown in Fig. 2, are preferably employed between the top and the bottom of the front of the housing 42 to support the same. Also attached to the front of the housing 42 is a pair of gauge shoes 53 and 54, each composed of an arcuate angle iron 56, and an L-shaped angle iron 57, with sheet steel 58 attached to the angle 56. The lower ends of the angles 56 are horizontal so that the angles form runners which slide over the ground when the tractor hitch arms are sufficiently lowered. The angles 57 are welded, or otherwise secured, to the rear end of the angles 56 to permit attaching the latter by bolts 59, through one of a plurality of holes 61, to the housing 42. Also, bolts 62 attach the front end of the angles 56 to the angle 47 through one of a plurality of holes 63. With this arrangement, it will be obvious that the angles 56 are vertically adjustable with respect to the housing 42 and the angles can thus be adjusted to guide the front end of the harvester over the ground. Further, Figs. 1 and 3 show that the rear wheel post 34 is provided with a series of holes 64 and a sleeve 66 is vertically adjustable on the post 34 while a pin 67 can be positioned through a hole in the sleeve and an aligned one of the holes 64 to permit the rear end of the harvester to be vertically adjusted with respect to the wheel 32. Thus, between the shoes 53 and 54, and the rear wheel, the harvester can be adjusted with respect to the ground, including tilting, raising, lowering, and leveling.

Further shown in Fig. 3 is a trailer hitch 68 which is suitably bolted to the underside of the top of the housing 42, as seen in Fig. 4. The hitch contains the usual pin hole 69 to receive the hitch pin and fasten a trailer to the harvester to haul the crop processed by the harvester. In that regard, Fig. 1 shows a crop delivery stack 71 extending from the housing 42 to an upper crop outlet end 72. The end 72 is positioned, above the trailer mentioned, to discharge the crops into the trailer in response to the operation of the harvester mechanism hereinafter described. Also, a diffuser 75 is pivotally attached to the stack 71 below the opening 72 for the purpose of controlling the blowing of crops through the outlet by moving the upper end into and out of the stack 71. Fig. 3 shows an opening 73 in the side 44 of the housing 42, and, as shown in Fig. 2, the lower end of the stack 71 is attached to the housing to enclose the opening 73. It should be understood, however, that while the delivery stack is shown to be attached at the near side of the housing 42, it could be attached at any point on the circumference of the housing with the opening 73 located accordingly. Also, the trailer mentioned need not be employed since the crops processed could be discharged onto the ground or into a truck at the side of the harvester.

It is preferred that guy braces 76 and 77 be attached between the housing 42 and the upper end of the stack 71 to support the latter on the harvester. Also, in the embodiment shown, a control brace 78 is attached between a deflector 79, pivotal on the top end of the stack 71, and a lever 81, pivotal on the harvester. The lever is pivotally mounted by a bolt 82 to a plate 83 which is welded or otherwise secured to the plate 28 to extend thereabove. The plate 83 contains holes 84 for receiving a retractable pin 85, of the lever 81 in a selected one of the holes. A spring biased bracket 90 yieldingly maintains the pin in the hole 84 by biasing the lever 81, as indicated. In this manner, the lever is adjustable to maintain the deflector 79 in a selected adjusted position and thus control the trajectory of the material being blown from the stack 71.

Fig. 4 shows a vertical shaft 86 depending from the gear box 38 and into the housing 42 through the opening in the top thereof. The end of the shaft within the housing is rotatably received within a bearing 87 suitably attached to the top of the housing to support the shaft. The lower end of the shaft 86 has a pair of plates 88 non-rotatably attached thereto to extend transversely to the shaft. In the embodiment disclosed, four separate arms 89 are clamped between the plates 88 to be radial of the shaft 86 and equally spaced therearound. A base bolt 91 holds the radially inward end of each arm 89 while a shear bolt 92 holds each arm to the plates 88 at an outer point. Thus, the arms 89 are rotatable with the shaft 86 within the housing 42, the side of which defines the extremity of the circular path of the arms. The direction of rotation, in the operation of the harvester, is shown by the arrow designated "A" in Fig. 4. Also shown is that the bottom of the housing 42 is open except for a circular flange 93 which is suitably welded to the bottom edge of the rim 51. It is then preferred that the outer ends of the arms 89 be enclosed by the housing with the flange or ring 93, as shown. Further, Fig. 4, shows as arcuate angle 95 which secures the top 43 to the front portion of the cylinder 44.

The outer end of each of the arms 89 has a cutting blade 94 secured to the underside thereof by bolts 96. A cutting edge 97, on each blade 94, is faced in the direction of rotation, as shown. Also, a fan blade 98 is securely attached by one of the bolts 96 and a bolt 99 to the upperside of each outer end of the arms 89 to project thereabove. A flexible wiper 101 is preferably attached to each blade 98 to extend radially outwardly and touch the inside or interior cylindrical wall of the housing side 44 during rotation of the arms 89.

Fig. 4 further shows an air baffle cylinder 102 attached to the underside of the housing top 43 in a position eccentric to the shaft 86 and the housing side 44. The blades 94 are disposed entirely between the cylinder 102 and the side 44 while the member 102 is, of course, shorter than the side 44 to permit the arms 89 to project clear of the free edge of the ring 102. A crop guide member 103 is attached to the top 43 to extend approximately tangentially from the ring 102 to one side of the housing opening 73 to span the space between the rings 44 and 102.

With this arrangement, it will be apparent that there is provided a rotor of a combined crop cutter and blower unit which is rotated through the power take-off means described, as the harvester is conveyed over the ground. The housing 42 is towed over standing crops which are then cut by the blades 94 and also chopped by the rotating blades as the cut crops are retained within the housing 42. Also, the rotation of the arms 89 causes the fan blades 98 to form a blower in the housing 42 to swirl the chopped crops around the annulus formed in the housing and blow them out the opening 73 and into the stack 71.

The blades 98 also act as paddles to contact the chopped crops and throw them from the housing out the opening 73 as the piece 103 serves as a stripper to direct the crops into the opening.

In the foregoing described operation, the blower is sufficiently effective to keep the chopped crops from falling out the open bottom of the housing, as most of the blower intake air can come from underneath the housing 42. Therefore, the harvester also operates as a suction pickup unit which can pick up loose crops from the ground and chop and deliver them through the stack 71. Of course, if the cutting blades 94 were omitted from the assembly, then there would be no chopping of the crops and they would only be picked up and delivered.

Referring again to the shear bolts 92, it should now be apparent that if the outer end of one of the arms 89 struck a rock or the like, the corresponding bolt 92 would shear to allow the arm to pivot about the bolt 91 and thus avoid damage to blades on the arm. The sheared bolt 92 could, of course, be easily replaced.

Fig. 5 shows that the harvester housing 42 may be provided with an adjustable air opening 104 in the top 43 on each side of the gear box 38. In this manner, a slidable cover 106 is positioned over each of the openings to adjust the size thereof and, therefore, permit a selected amount of air to pass into the housing 42. Thus, if the housing is operated close to the ground, the blower intake air entering underneath the housing may be too great for the particular operation of pickup or blowing and the admission of air through the opening 104 will lessen the effect of air entering under the housing. The cover 106 is shown in the closed position at the bottom half of the view, and it is shown open in the upper half of the view.

Figs. 3, 4, and 6 disclose a member 107 attached across the base of the housing opening 73 of the side 44. It is preferred that the member 107 be straight across its front 108 to be disposed as a chord with respect to the circular housing 42, as shown. Also, it is preferred that the front edge be arcuate, as shown in Fig. 6, and, with this arrangement, crops which would otherwise cling to the base of the stack 71 or that portion of the circular housing 42 at the opening 73, are wiped away from the stack inlet by the member 107 which causes such crops to be brushed by the ground as the harvester is conveyed forward.

An alternate structure is shown in Fig. 7 where the front of the harvester 10 is provided with an opening 105 which is a relieve front section of the cylindrical housing 42. The opening is defined by the raised lower edge 105a of the housing 42 and the dot-dash line 105b which is the original location of the lower front edge without an opening 105. The remainder of the side 44 is the same. With this arrangement, crops can enter the front or intake end of the harvester without being bent as much as they might otherwise be. With the balance of the housing side 44 and the standing crops immediately in front of the rotor, the housing is sufficiently formed to serve as a blower housing, as desired.

Another alternate construction of the housing 42 is shown in Fig. 8 wherein the front end of the housing 42 is shown to contain openings 110. The front section of the circular housing 42 is thus provided with openings 110 which permit the standing crops to enter the housing without being bent over as they might otherwise be bent. In this embodiment, of course, the safety ring 93 is not employed at least through the front section containing the openings. However, the housing is still circular and, therefore, adequate to form a blower housing and also safe in that the portions 109, intermediate the openings 110, are available to block rock, debris, or the like, and any part of the rotating assembly that might be thrown by the force of rotation.

In Fig. 9, there is shown a front perspective view of the harvester 10 as disclosed in Fig. 1 with a modified super-structure for tilting and leveling the harvester. In this embodiment, the tractor 11 contains its usual hitch 111 to which is pivotally attached a harvester drawbar 112 by means of a vertical pin 113. The drawbar 112 contains transverse sections 114 and 116 which are circular and located at the rear end of the drawbar. A pair of bearing brackets 117 is suitably bolted to the forward ends of the angle irons 31 to rotatably receive the sections 114 and 116, as shown. A wheel axle 118 is also transversely disposed to the harvester 10 to extend rotatably over the top thereof by being mounted in four bearing plates 119 which are attached to the frame of the harvester. The ends of the axle 118 each contain an offset arm 121 to rotatably support a ground wheel 122. Since this arrangement fully supports the harvester at the tractor hitch and at the wheels 122, there is no rear wheel in this embodiment. Attached between the drawbar 112 and one of the plates 119, which is bolted to the angle 31, is an adjustable link 123 composed of a threaded sleeve section 124 and a threaded crank section 126. Sections 124 and 126 are, therefore, threadedly adjustable with the crank section 126 being retained from axial movement and supported by an arm 127 welded at its lower end to the drawbar transverse section 116 to be rigid therewith. The usual sleeve bearing 128 engages the crank 126 by trunnions 129 which pivotally attach the arm 127 and the link 123. Also, the opposite end of the link 123 is pivotally attached to the bearing 119 by a bolt 130. The link 123 and the connecting parts thus makes the connection between the drawbar and the harvester an adjustable rigid connection, or bracing means, to prevent the front of the harvester from freely jack-knifing with the drawbar. After the harvester is raised or lowered by the hereinafter described mechanism, extension or contraction of the link 123 will level or tilt the harvester, as desired. If it is desired to raise the front end of the harvester, turning of the crank 126 in a direction to lengthen the link 123 will cause the harvester front end to be raised. The opposite turning of the crank will shorten the link and correspondingly lower the harvester front end.

A harvester raising and lowering mechanism or lever means is also mounted on the top of the harvester and includes a tilting lever 131 pivotally attached by a bolt 132 to an arm 133 welded to the axle 118 to extend thereabove and be non-rotatable thereto. A brace 134 is connected between the lever 131 and the top of the arm 133 while another brace 136 is connected between the lever and an arm 137 welded to the axle 118 to be non-rotatable thereto like the arm 133. Thus, movement of the lever 131 rotates the axle 118 in the bearings 119 to raise or lower the harvester 10 on the wheels 122. A quadrant 138 is pivotally attached at its lower end, through a rod 139, to the drawbar 112 to present the usual teeth 141 to the usual pin 142 retractably mounted on the lever 131. The latter is thus secured in a selected tilted position as the tractor operator sets the lever 131 by moving a handle 143 on the lever to retract the pin 142 and permit the lever to move up and down on the quadrant.

A tension coil spring 144 is attached between the top of the arm 133 and a clamp 146 on the rear of the harvester. The lever 131 is then yieldingly urged upwardly by the spring 144 and this action assists the operator in raising the lever 131 and, consequently, raising the harvester.

A shield 147 extends rearwardly of the tractor 11 and encloses the usual power take-off shaft which flexibly connects to a shaft in the shield 148 through a universal joint. The shield and its enclosed shaft are broken away for convenience of showing parts behind it. A stand 149 is suitably attached to the drawbar and a stand 151 is attached to the top of the harvester and both support the shields covering the shafts leading into the clutch 41. Thus, there is a complete rotary driving connection between the tractor and the harvester.

The rod 139 on the drawbar also supports a stand 152 which carries an arm 153, as shown. Two control rods 154 and 156 are maintained at one end by the arm 153 and they extend rearwardly to a stack 157. The rod 154 further connects to a link 158 which is bifurcated at one end 155 to engage the stack 157 and permit turning of the upper end of the stack at the line 160. The rod 156 is attached to the stack 157 by a link 159 pivotally mounted on the stack, and the rod connects to a link 161 which swivelly attaches at 162 to a link 163 pivotally mounted on the outlet end of the stack. The link 163 attaches to a pivotal deflector 164 through a bifurcated connector 165. The rods are also provided with handles 166 which are located within the reach of the operator seated on the tractor so he can conveniently manipulate the rods to select a position for the parts on the stack. Of course, turning of the stack by operation of the rod 154 permits the crops being processed to be delivered at the selected place behind the harvester. The swivel connection at 162 is of a well-known type which will permit the upper end of the stack to be turned without affecting the deflector control 156.

While specific embodiments of this invention have been shown and described, the scope of this invention should be limited only by the appended claims.

We claim:

1. A crop harvester comprising a vertically disposed cylindrical housing a drawbar pivotally attached to said housing, a top on said housing, a vertically disposed shaft rotatably projecting through said top to be co-axial with said cylindrical housing with the lower end of said shaft terminated within said housing, a plurality of arms attached to said shaft lower end to extend transversely radially therefrom, a crop cutter blade and a fan blade attached to each of said arms to be disposed adjacent the inner wall of said cylindrical housing, the side of said cylindrical housing having a crop outlet opening, housing supporting wheel means on said housing to be engageable with the ground for vertically adjustably guiding said harvester over the ground at a selected height, and crank means connected between said drawbar and said housing for horizontally leveling said harvester to a position where said harvester can either cut standing crops or pick up cut crops from the ground and deliver said crops through said housing and out said opening in response to rotation of said shaft, a crop delivery stack attached to said housing to be in communication with said crop outlet opening and extend upwardly from the latter for receiving crops blown through said outlet opening.

2. A crop harvester adaptable to being moved over the ground and comprising a vertically disposed cylindrical housing having an open bottom and an open lower front section on the forward side of movement, a top on said housing, a rotatable shaft projecting through said top to be axially aligned with said cylindrical housing and having the lower end of said shaft terminate within said housing, a plurality of arms non-rotatably attached to said shaft lower end to extend transversely therefrom to the proximity of said cylindrical housing, a crop cutter attached to the free end of each of said arms, a fan blade attached to the free end of each of said arms, said cutter and said blade disposed adjacent the inner wall of said housing, said housing having a crop outlet opening in the side thereof, an air baffle cylinder attached to the underside of said top and eccentric of said shaft toward the rear of said housing, a crop guide member attached to said housing and extending between said cylinder and the cylindrical wall of said housing at one side of said opening whereby crops are cut upon rotation of said shaft and blown from said housing through said outlet.

3. A crop harvester of the type movable over the ground and comprising a vertically disposed cylindrical housing, a top on said housing, a vertically disposed shaft rotatably projecting through said top to be co-axial with said cylindrical housing with the lower end of said shaft terminated within said housing, a plurality of arms attached to said shaft lower end to extend transversely radially therefrom, a crop cutter blade and a crop blower blade each attached to each of said arms to be disposed adjacent the inner wall of said cylindrical housing, said cylindrical housing having a crop outlet opening in the side thereof, a crop delivery stack attached to said housing to communicate with said outlet opening, ground supporting means attached to said housing for adjustably guiding said harvester over the ground at a selected height, a drawbar pivotally attached to said housing for pivotal motion about a horizontal axis, an upstanding plate on said housing, an upstanding arm on said drawbar, and screw-adjustable crank means connected between said plate and said arm for horizontally leveling said harvester all whereby rotation of said shaft causes said harvester to cut standing crops and to pick up cut crops from the ground and to deliver said crops through said housing and said outlet opening and through said crop delivery stack.

4. A crop harvester comprising a vertically disposed cylindrical housing, a top on said housing with said top having an air intake opening centrally located therein, a rotatable shaft projecting through said top to be axially aligned with the said cylindrical housing and having the lower end of said shaft terminate within said housing, a plurality of arms attached to said shaft lower end to extend transversely therefrom adjacent the interior of said cylindrical housing, a crop cutter attached to the free end of each of said arms, a fan blade attached to the free end of each of said arms, a cylinder on the underside of said top eccentric to said shaft and encircling said intake opening and being disposed radially inwardly of each said blade, a cover on said intake opening for selectively altering the amount of air passage space through said opening, means attached to said housing for supporting the latter near the ground whereby intake air enters under said housing through the bottom thereof and through said intake opening in said top, said housing having a crop outlet opening in the side thereof whereby rotation of said shaft causes crops to be picked up from the ground and cut and blown from said housing through said outlet.

5. A tractor conveyed crop harvester comprising a vertically disposed cylindrical housing, a top on said housing, a vertically disposed shaft rotatably projecting through said top to be co-axial with said cylindrical housing with the lower end of said shaft terminated within said housing, a plurality of arms attached to said shaft lower end to extend transversely radially therefrom, a crop cutter blade and a crop blower blade both attached to each of said arms to be disposed adjacent the inner wall of said cylindrical housing, the side of said cylindrical housing having a crop outlet opening, a drawbar pivotally attached to the front of said harvester about a horizontal pivot axis, a wheel axle rotatably attached to said housing to extend transversely thereto, a wheel rotatably mounted offset on each end of said axle to support said harvester on the ground, lever means on said drawbar and connected to said axle for rotation of said axle for raising and lowering said harvester housing, and an adjustable link attached between said housing and said drawbar to form a rigid connection therebetween for setting the pivotal relation therebetween for tilting and leveling of said housing.

6. A crop harvester comprising a vertically disposed cylindrical housing, a top on said housing, a vertical shaft rotatably projected through said top and axially into said housing to terminate at a lower end within said housing, a plurality of arms non-rotatably attached to said shaft lower end to extend transversely therefrom, a crop cutter blade attached to the free end of each of said arms to be disposed adjacent the interior wall of said housing, a crop blower blade attached to the free end of each of said arms to be disposed adjacent the interior wall of said housing, said housing having a crop outlet opening in the cylindrical wall thereof, an air baffle cylinder attached to the underside of said top and eccentric of said shaft toward the rear of said housing, a crop guide member attached to said housing and extending between said cylinder and the cylindrical wall of said housing at one side of said opening whereby rotation of said shaft causes crops to be cut and to be forced from said housing along said guide and out said opening.

7. A cut crop harvester comprising a vertically disposed cylindrical housing having a crop outlet opening in the wall thereof, a wheel on said housing for mobilizing the latter in a forward direction, a top on said housing, a cylinder attached to the undersurface of said top and depending therebelow and eccentric to the rear of said housing and said forward direction, a crop guide member attached to said housing to be disposed on the under surface of said top and depending therebelow from said cylinder to one side of said outlet opening, a rotatable shaft vertically projecting through said top and axially and concentrically disposed with respect to said housing with the lower end of said shaft terminated within said housing, a crop blower blade and a crop cutter blade both attached to said shaft lower end and disposed between said cylinder and the interior wall of said housing whereby rotation of said shaft creates air flow into said housing open bottom and out said outlet opening with cut crops being drafted into said housing from the ground and forced from said housing along said guide member.

8. A crop harvester comprising an axle, a pair of ground wheels attached to said axle offset from the axis thereof and spaced apart, a harvester housing swingably suspended from said axle between said wheels, a drawbar pivotally attached to the front of said housing about a horizontal pivot axis parallel to said axle, adjustable lever means connected between said drawbar and said axle for rotating the latter, adjustable crank means between said drawbar and said housing for setting the pivotal relation therebetween, and a rotor in said housing for cutting and blowing crops encountered by said harvester.

9. A crop harvester comprising an axle, a pair of ground wheels attached to said axle offset from the axis thereof and spaced apart, a harvester housing swingably suspended from said axle between said wheels, a drawbar pivotally attached to said housing about a horizontal pivot axis disposed parallel to said axle, an arm projecting transversely from said axle, a lever attached to said arm for rotation of the latter and said axle to raise and lower said housing, a quadrant pivotally mounted on said drawbar and engaged with said lever for selective positioning of the latter, an upstanding plate on said housing, a crank threadedly engaged between said plate and said drawbar for swingably positioning said housing, and a rotor in said housing for cutting and blowing crops encountered by said harvester.

10. In a crop harvester of the type including a housing and a rotor for cutting and blowing crops, the combination comprising an axle for swingably supporting said housing, a pair of wheels offset on said axle toward the rear of said harvester, a drawbar pivotally attached to said housing about a pivot axis parallel to said axle, an arm projecting transversely on said axle to rotate therewith, a lever attached to said arm for rotation of said axle to raise and lower said housing on said wheels, a quadrant mounted on said drawbar and engaged with said lever for maintaining the latter in a selected position of rotation, a tension spring attached between said arm and said housing rearwardly of said axle for yieldingly urging said axle in one direction of rotation, an upstanding plate on said housing, and a threaded crank with one end connected to said plate and the opposite end connected to said drawbar for adjustably swinging said housing on said axle to selected positions of tilt.

References Cited in the file of this patent

UNITED STATES PATENTS

| | | |
|---|---|---|
| 1,899,564 | Frey | Feb. 28, 1933 |
| 2,535,122 | Day | Dec. 26, 1950 |
| 2,578,880 | Doyle | Dec. 18, 1951 |
| 2,592,991 | Yeager et al. | Apr. 15, 1952 |
| 2,659,191 | Miller et al. | Nov. 17, 1953 |
| 2,685,160 | Kuhary et al. | Aug. 3, 1954 |
| 2,701,942 | Caldwell et al. | Feb. 15, 1955 |
| 2,719,396 | Morris et al. | Oct. 4, 1955 |
| 2,737,003 | Beers | Mar. 6, 1956 |